United States Patent [19]
Shekita et al.

[11] Patent Number: 5,671,403
[45] Date of Patent: Sep. 23, 1997

[54] ITERATIVE DYNAMIC PROGRAMMING SYSTEM FOR QUERY OPTIMIZATION WITH BOUNDED COMPLEXITY

[75] Inventors: Eugene Jon Shekita; Honesty Cheng Young, both of San Jose, Calif.

[73] Assignee: International Business Machines Corporation, Armonk, N.Y.

[21] Appl. No.: 367,502

[22] Filed: Dec. 30, 1994

[51] Int. Cl.$^6$ ............................................. G06F 17/30
[52] U.S. Cl. .................. 395/603; 395/602; 395/604; 395/605; 395/611
[58] Field of Search .................... 395/600, 602, 395/603, 604, 605, 611; 364/DIG. 1

[56] References Cited

U.S. PATENT DOCUMENTS

| | | | |
|---|---|---|---|
| 4,769,772 | 9/1988 | Dwyer | 364/300 |
| 4,829,427 | 5/1989 | Green | 364/300 |
| 5,043,872 | 8/1991 | Cheng et al. | 364/200 |
| 5,067,166 | 11/1991 | Ito | 382/37 |
| 5,241,648 | 8/1993 | Cheng et al. | 395/600 |
| 5,276,870 | 1/1994 | Shan et al. | 395/600 |
| 5,301,317 | 4/1994 | Lohman et al. | 395/600 |
| 5,345,585 | 9/1994 | Iyer et al. | 395/602 |
| 5,367,675 | 11/1994 | Cheng et al. | 395/600 |
| 5,412,806 | 5/1995 | Du et al. | 395/600 |
| 5,469,568 | 11/1995 | Schiefer et al. | 395/602 |
| 5,495,605 | 2/1996 | Cadot | 395/600 |
| 5,542,073 | 7/1996 | Schiefer et al. | 395/602 |
| 5,544,355 | 8/1996 | Chaudhuri et al. | 395/600 |
| 5,548,758 | 8/1996 | Pirahesh et al. | 395/602 |
| 5,574,900 | 11/1996 | Huang et al. | 395/601 |
| 5,608,904 | 3/1997 | Chaudhuri et al. | 395/602 |
| 5,615,361 | 3/1997 | Leung et al. | 395/603 |

OTHER PUBLICATIONS

W. Hong et al., "Optimization of Parallel Query Execution Plans in XPRS", *Distributed and Parallel Databases*, vol. 1, No. 1, pp. 9–32, Jan. 1993.

K. Ono et al., "Measuring the Complexity of Join Enumeration in Query Optimization", *Proceedings of the 16th VLDB Conference*, Brisbane, Australia, Aug. 1990, pp. 314–325.

P. Selinger et al., "Access Path Selection in a Relational Database Management System", *Proc. of the 1979 Assoc. of Comp. Mach.(ACM) SIGMOD Intl Conf. On Management of Data*, Boston, MA, Jun. 1979, pp. 23–24.

A. Swami, "Optimization of Large Join Queries: Combining Heuristics and Combinatorial Techniques", *Proc. of 1989 ACM-SIGMOD Intl Conf. of Management of Data*, Portland, Oregon, Jun. 1989, pp. 367–376.

Y. Ioannidis et al., "Randomized Algorithms for Optimizing Large Join Queries", *Proc. of the 1990 ACM-SIGMOD Intl Conf. on Management of Data*, Atlantic City, NJ, May 1990, pp. 312–321.

Y. Ioannidis et al., "Query Optimization by Simulated Annealing", *Proc. of the 1987 ACM-SIGMOD Conf. on Management of Data*, San Francisco, CA, May 1987, pp. 9–22.

(List continued on next page.)

*Primary Examiner*—Thomas G. Black
*Assistant Examiner*—Jean Raymond Homere
*Attorney, Agent, or Firm*—Baker, Maxham, Jester & Meador

[57] ABSTRACT

A query optimizer for optimizing join queries in a relational database system by iterative application of dynamic programming (DP) to select optimal subgraph join execution plans. Unlike traditional DP optimization methods, bounds on search space time and space complexity can be established and adjusted by imposing a subgraph threshold. Each bounded subgraph is selected using a greedy heuristic (GH) hill-climbing procedure or other similarly useful technique to build a low-cost execution plan. The low-cost GH subgraph execution plan is then discarded in favor of an optimal DP subgraph execution plan selected by a dynamic programming optimizer for each subgraph identified by the bounded GH optimization process. The complexity bound may be dynamically tuned to improve execution plan quality responsive to changes in query complexity.

6 Claims, 4 Drawing Sheets

OTHER PUBLICATIONS

A. Shibamiya et al., "DB2 Cost Formula", *IBM Technical Disclosure Bulletin*, vol. 34, No. 12, May 1992, pp. 389–394.

D. Cornell et al., "Integrated Buffer Management and Query Optimization Strategy for Relational Databases", *IBM Technical Disclosure Bulletin*, vol. 32, No. 12, May 1990, pp. 253–257.

E. Omiecinski, "Heuristics for Join Processing Using Nonclustered Indexes", *IEEE Trans. on Software Engineering*, vol. 15, No. 1, Jan. 1989, pp. 18–25.

S. Lee et al., "Semantic Query Reformulation in Deductive Databases", *IEEE Proc. of the 7th Intl Conf. on Data Engr.*, Koby, Japan, Apr. 1991, pp. 232–239.

M. Shan et al., "Method of Evaluating a Recursive Query of a Database", World Intellectual Property Organization, Publication No. WO92/15066, Sep. 1992.

R. Kabler et al., "Performance Evaluation of Algorithms for Transitive Closure", *Information Systems*, vol. 17, No. 5, Sep. 1992, pp. 415–441.

S. Chi et al., "Recursive Query Answering with Non–Horn Clauses", *Proc. of the 9th Intl. Conf. on Automated Deduction*, Argonne, ILL, May 1988, pp. 294–313.

S. Pramanik et al., "Optimizing Join Queries in Distributed Databases", *IEEE Trans. On Software Engr.*, vol. 14, No. 9, pp. 1319–1326, Sep. 1988.

A. Chen et al., "Properties of Optimal Semi–join Programs for Distributed Query Processing", *Proc. of the IEEE Comp. Soc., 7th Intl. Comp. Sofware and Appls. Conf.*, Chicago, Ill. Nov. 1983, pp. 476–483.

M. Chen et al., "Using Join Operations as Reducers in Distributed Query Processing", *Proc. 2nd Intl. Sym. on Databases in Parallel and Distributed Systems*, Dublin, Ireland, Jul. 1990, abstract only.

D. Cornell et al., "Integrated Site Assignment for Relations and Join Operations in Distributed Transaction Processing", *IBM Technical Disclosure Bulletin*, vol. 32, No. 4A, Sep. 1989, pp. 306–314.

FIG. 2J $$\bullet (P_4, P_1) \rightarrow P_1 = [[R_4, R_5, R_6], \overbrace{[R_1, R_7, \underbrace{[R_2, R_3]}_{G_2}]}^{G_1}]$$
$$\underbrace{\phantom{[[R_4, R_5, R_6],}}_{G_4}$$

ITERATIVE DYNAMIC PROGRAMMING SYSTEM FOR QUERY OPTIMIZATION WITH BOUNDED COMPLEXITY

BACKGROUND OF THE INVENTION

1. Field of the Invention

This invention relates generally to relational database query optimizer systems and specifically to an iterative dynamic programming system for successive optimization of query plans after parsing into subgraphs by a greedy join heuristic.

2. Description of the Related Art

Query optimizers operate in relational database management systems to translate queries posed in a non-procedural language such as SQL into an efficiently executable plan. Reference is made to C. J. Date, *An Introduction to Database Systems*, Vol. 1, 4th Ed., "Chapter 16: Query Optimization", p. 335 et seq., Addison-Wesley Publishing Co., Reading, Mass. (1986), for an overview of the optimization process known in the art. According to Date, the query optimization process has four stages. These are (a) recasting the user query into some internal representation, (b) convening to canonical form, (c) choosing prospective implementation procedures and generating executable plans, and (d) choosing the optimum (lowest cost) of such plans.

The "Query Graph Model" described by Pirahesh et al. ("Extensible Rule-Based Query Rewrite Optimization in STARBURST", *Proc. ACM-SIGMOD Intl. Conf. on Management of Data*, San Diego, Calif., June 1992, pp. 39–48) is an example of a preferred internal representation of the user query known in the art, and the "join graph" is an example of a preferred canonical form. As used herein, a join graph denominates a user query representation having nodes connected by edges, wherein each node represents a relation and each edge represents a join predicate. The "join" operator is a powerful relational database operator that creates a new relation from the elements of two operands; the "outer" relation and the "inner" relation. The outer and inner relations can be represented as two nodes in a join graph connected by an edge representing the join predicate or condition imposed by the join. As is well-known in the relational database art, a "relation" denominates a database table having rows ("tuples") and columns. A "join predicate" relates columns of two relations to be joined by specifying conditions on column values. Each column in a relation referenced by a join predicate is herein denominated a "join column". The "cardinality" of a relation denominates the number of tuples embraced by the relation and the "selectivity" of a join predicate denominates the expected fraction of tuples for which the join column value in the relation satisfies the predicate. Accordingly, as is well-known in the art, query cardinality is the product of the cardinalities of every relation in the query times the product of the selectivity factors of the query predicates.

The art is replete with detailed descriptions of the join query. For instance, in U.S. Pat. No. 5,241,648, entirely incorporated herein by this reference, Cheng et at. disclose a hybrid technique for joining tables that selects a join execution plan from among the well-known "nested-loop" and "sort-merge" methods. In U.S. Pat. No. 5,043,872, entirely incorporated herein by this reference, Cheng et al. disclose a method for optimizing query execution that relies on measuring the degree of "clustering" (sortedness) in the stored relations. That is, Cheng et al. propose testing each join column to calculate the degree of clustering of the column values in their storage order to estimate the number of page accesses required for a partial index scan. These estimates are then used to calculate the "cost" of each proposed join execution plan, leading ultimately to an "optimal" plan.

For a lucid discussion of the "join graph", reference is made to Kiyoshi Ono et al. ("Measuring the Complexity of Join Enumeration in Query Optimization", *Proc. of the 16th Intl. Conf. on Very Large Data Bases*, Brisbane, Australia, pp. 314–325, 13–16 Aug. 1990). Ono et al report experimental results demonstrating that the complexity of query optimization is largely dependent upon the shape of the query graph, which indicates both the number and manner of relation interconnection by predicates. They further demonstrate that enumeration of the join sequences for a query is the dominant factor in both the time required to select an optimal query execution plan and the quality of the resulting plan. Ono et al. describe "linear queries" as a series of relation nodes each connected by predicate edges to no more than two other relation nodes. They also describe "star" queries as a group of relation nodes with a single central relation node connected by predicate edges to each of the other relation nodes. As described by Ono et al., any user query can be recast as a join graph made up of some combination of "linear" and "star" subgraphs.

Much effort in the query optimization art is devoted to improving on Date's third step of choosing prospective implementation procedures and generating executable plans. The query optimizer known in the relational database management system art translates nonprocedural queries into a procedural plan for execution, typically by generating many alternative plans, calculating the execution cost of each and choosing the plan having the lowest estimated cost. Because relational database management systems typically support only diadic (2-way) join operators as permutative operations, the query optimizer must choose the "best" sequence of two-way joins to achieve the N-way join embodied in a user query. A join graph representing such a series of two-way joins is generated during Date's second step as a "canonical" form of the query graph model (QGM). The practitioner may then either (a) exhaustively enumerate all possible "feasible plans" for join execution, using "dynamic programming", or may (b) employ some "heuristically limited" search method to reduce the number of alternative plans in the search space considered by the optimizer. It is easily proven that dynamic programming never eliminates an optimal plan, because all possible plans are enumerated and evaluated. However, any "heuristic" search method known in the art presents some non-zero probability of excluding a superior execution plan without notice. There are usually many feasible plans for any given query and many practitioners use the exponential worst-case complexity argument to justify a'priori search space truncation through heuristic search methods. That is, because dynamic programming search spaces grow as N!, practitioners using large DBMSs normally do not consider such exhaustive enumeration methods for search space generation. Herein, a "search space" denominates a set of executable query plans selected on the basis of some criteria related to primitive database operators.

As may be expected, the query optimization art is replete with "heuristic" search methods for limiting the time and space complexity of query optimization (which is different from query execution cost) by truncating the enumeration of feasible query execution plans. Dynamic programming (DP) is the time-honored method for optimizing join queries in relational database management systems and virtually all commercial optimizers rely on some abbreviated form of DP for this purpose. DP uses exhaustive enumeration with pruning to produce "optimal" execution plans without any measurable probability of missing the best of these plans. Reference is made to Selinger et al. ("Access Path Selection in a Relational Database Management System", *Proc. of the 1979 Assoc. of Comp. Mach. (ACM) SIGMOD Intl Conf. on Management of Data*, Boston, Mass., June 1979, pp. 23–34) for a detailed description of the DP optimizer known in the art. Selinger et al. observe that, although the cardinality of the join of N relations is the same regardless of join order, the "cost" of joining in different orders may vary substantially. Accordingly, for a N-way join query, there are N! permutations of relation join orders embraced by the "search space" generated by DP.

This exponential time and space complexity of DP represents a significant weakness that makes DP impractical in some applications. For instance, an ad hoc join query with sixteen small relations may require more time for query "optimization" than for the actual execution of any one of the plans in the exponentially-large search space. For this reason, many practitioners employ heuristic techniques for limiting the number of feasible plans in the search space during query optimization. For instance, one heuristic operates to construct only joins in which a single relation is joined at each step with the results of previous joins, in a pipelined fashion. This generates plans that avoid so-called "composite inners" (often referred to as "bushy trees") in which the inner join operand is a result of a join of several relations that must be materialized in memory or on disk. The pipelined heuristic saves the cost of this materialization but may (indeed, often will) exclude better plans for certain queries, as described by Ono et al. in the above-cited reference.

Another technique is the adaptive search space technique disclosed by Lohman et al. in U.S. Pat. No. 5,301,317, entirely incorporated herein by this reference. Lohman et al. describe an automated method for trading off estimated query optimization time against estimated query execution time when establishing the DP search space. They first select the least costly plan from a small search space defined by disabling all "optional" classes of plan alternatives. This first "optimal" execution plan is then evaluated to obtain an initial estimate of query execution time, which is then evaluated to determine whether the time needed for additional query optimization in a larger search space is warranted.

The significant disadvantage of any heuristic limitation of DP search spaces is the non-zero probability of unknowingly eliminating the best join execution plan from the search space. The tension between exhaustive enumeration (using DP) and heuristic limitation (HL) of a search space is a manifestation of the "global optimization problem" known in the mathematical arts. The global optimization problem is generally considered to be the problem of locating a global optimum in a large space having many local optimal. Each solution to a combinatorial optimization problem can be viewed as "state" in a "state space". For query optimization, the state space is the search space wherein each state represents a complete ordered "join sequence" describing the feasible join execution plan for a query. Each state in the search space has a "cost" associated with it as defined by some "cost function". A "move" is a perturbation applied to a solution to get another solution; that is, one "moves" from the state represented by a former solution to the state represented by a new solution. A "move set" is the set of moves available to proceed from one state to another, where each state in the search space is associated with a "move set". A move is chosen from the move set according to a probability distribution specified as part of the move set. Two states are said to be "adjacent" states if one move suffices to go from one state to the other. The "local minimum" in the state space is a state such that its cost is lower than that associated with all adjacent states. There may be many such local minima. A "global minimum" is a state that has the lowest cost among all local minima in the state space.

The usual practical solution to the global optimization problem is to search through the space while indexing across several of the local optimal until such time as the search "should" be terminated according to some heuristic limitation (HL) criteria. Reference is made to, for instance, Arun Swami ("Optimization of Large Join Queries: Combining Heuristics and Combinatorial Techniques", *Proc. of 1989 ACM-SIGMOD Intl Conf. on Management of Data*, Portland, Oreg., June, 1989, pp. 367–376) for a discussion of the use of heuristics in optimizing queries with a large number of joins. Swami describes the "augmentation" heuristic and the "local improvement" heuristic as well as the heuristic proposed by Krishnamurthy et at. and compares these with the iterative improvement (II) and the simulated annealing (SA) combinatorial optimization techniques known in the global optimization art.

Some HL optimization procedures rely on randomization to reduce search space complexity. Although these randomized HL processes offer useful alternatives to DP, none are easily incorporated into DP optimizers because they do not enumerate joins in the same bottom-up manner as does DP. For instance, Y. Ioannidis, et al. ("Randomized Algorithms for Optimizing Large Join Queries", *Proc. of the 1990 ACM-SIGMOD Intl. Conf. on Management of Data*, Atlantic City, N.J., 23–25 May 1990, pp. 312–321) discuss the SA and II randomized processes for query optimization. Ioannidis et al. conclude that SA identifies a lower cost access plan than II because the shape of the cost function over the solution space associated with such queries resembles a "cup" with relatively small variations at the bottom, which minimizes the opportunity for "false" optimal. They also describe a "Two Phase Optimization" process that combines SA and II to some advantage.

Simulated annealing (SA) is a member of the class of probabilistic "hill-climbing" algorithms known in the general global optimization art as risky. That is, because the hill-climbing algorithms are "greedy", the procedures inevitably stop at the first "local" optimum found in the search space, without any further struggle toward the "global" optimum. The SA procedure can be combined with heuristic "enhancements" to help overcome the greediness of the algorithm, as discussed by Ioannidis, et al. in a second paper ("Query Optimization by Simulated Annealing", *Proc. of the 1987 ACM-SIGMOD Conf. on Management of Data*, San Francisco, Calif., 27–29 May 1987, pp. 9–22), but some risk remains in any SA process.

The Sgd process described by Chen et al. ("Scheduling and Processor Allocation for Parallel Execution of Multi- Join Queries", *Eighth Intl. Conf. on Data Engrg*, Feb. 3-7, 1992, p. 60) is a simple "greedy heuristic" that is widely used in such systems as the Data Base 2 (DB2/6000) Data Base Management System sold by the International Business Machines Corporation. The Sgd procedure starts at a state and randomly selects adjacent states to test the change in "cost" incurred by moving from the initial state to each new adjacent state. This iterative process continues until a "local minimum" state is identified.

Some practitioners attempt to reduce search space complexity by tinkering with the cost formula for the several states within the search space. For instance, A. Shibamiya et al. "DB2 Cost Formula", *IBM Technical Disclosure Bulletin*, Vol. 34, No. 12, pp. 389-394, May, 1992) discuss the cost formula used in the DB2 query optimizer, which attempts to dynamically select the most efficient access path based on selected statistics available at execution time. Similarly, D. Cornell et al. ("Integrated Buffer Management and Query Optimization Strategy for Relational Databases", *IBM Technical Disclosure Bulletin*, Vol. 32, No. 12, pp. 253-257, May, 1990) describe an "objective function" that is similar to the cost function but is improved by summing over all query types weighted by query frequencies.

Others have proposed heuristics based on relation constraints. For instance, E. R. Omiecinski ("Heuristics for Join Processing Using Nonclustered Indexes", *IEEE Trans. on Software Engineering*, Vol. 15, No. 1, pp. 18-25, January, 1989) describes a useful heuristic for minimizing the number of page accesses needed to compute a join when only non-clustered access paths are available. Lee et al. ("Semantic Query Reformulation in Deductive Databases", *IEEE Proc. of the 7th Intl. Conf. on Data Engr.*, Koby, Japan, 8-12 Apr. 1991, pp. 232-239) describe a method for identifying relevant integrity constraints for queries involving joins or unions of base relations with defined relations by use of join graphs. In U.S. Pat. No. 5,067,166, Ito describes a pattern recognition method and apparatus using dynamic programming to match an input label sequence to a set of candidate templates. Ito does not consider the application of DP to query optimization, but does provide a lucid theoretical description of dynamic programming.

Many practitioners have proposed query optimization techniques adapted to special database applications such as "cyclic" (recursive) queries and "distributed" databases. For instance, application of the "fix-point" operator to recursive query execution is described by Shan et al. (World Intellectual Property Organization Publication No. WO 92/15066) and Kabler et al. ("Performance Evaluation of Algorithms for Transitive Closure", *Information Systems*, Vol. 17, No. 5, pp. 415-441, September 1992). In particular, Kabler et al. discuss the general execution problem of computing the transitive closure of a directed graph in a disk-based environment but neither consider nor suggest application of their theoretical strategies to the query optimization art. Chi et al. "Recursive Query Answering with Non-Horn Clauses", *Proc. of the 9th Intl. Conf. on Automated Deduction*, Argonne, Ill., 23-26 May 1988, pp. 294-313) describe a method for answering recursive queries under the Generalized Closed World Assumption (GCWA) in a database having positive non-Horn ground clauses. In U.S. Pat. No. 5,345,585, entirely incorporated herein by this reference, Iyer et al. describe a heuristic for optimizing cyclic (recursive) join queries that combines randomizing and local improvements with a previously known polynomial time query optimization procedure. They use both nested-loop and merge join methods to optimize cyclic joins in time $O(N^4)$.

Other practitioners consider query optimization in distributed databases, employing the "semi-join" operator known in the art. For instance, in U.S. Pat. No. 4,769,772, P. Dwyer describes an automated query optimization method using both global and parallel local optimization for Materialization and Access Planning (MAP) in a distributed database system. Dwyer chooses to optimize locally if such is more efficient than optimizing over the distributed system. S. Pramanik et al. ("Optimizing Join Queries in Distributed Databases", *IEEE Trans. on Software Engr.*, Vol. 14, No. 9, pp. 1319-1326, September 1988) consider query optimization using semi-join operators and observe that the class of user queries represented by "acyclic" (nonrecursive) join trees can be executed with a sequence of semi-joins. The acyclic class of join graphs is known to include all join graphs wherein no predicate edge closes an uninterrupted circuit formed by an edge plurality. Chen et al. ("Properties of Optimal Semi-Join Programs for Distributed Query Processing", *Proc. of the IEEE Comp. Soc. 7th Intl. Comp. Software and Appls. Conf.*, Chicago, Ill., 7-11 Nov. 1983, pp. 476-483) discuss the properties of optimal semi-join programs for processing distributed query graphs and introduce the "execution graph" to represent semi-join programs. Chen et al. show how to develop an efficient procedure for deriving optimal semi-join programs by exhaustive search to overcome the sub-optimal selection problem known for distributed query optimization. In a second paper, Chen et al. ("Using Join Operations as Reducers in Distributed Query Processing", *Proc. 2nd Intl. Sym. on Databases in Parallel and Distributed Systems*, Dublin, Ireland, 2-4 Jul. 1990, pp. 116-123) describe a judicious application of join operations to reduce complexity in semi-join graphs for distributed queries according to an efficient heuristic limitation procedure. Cornell et at. ("Integrated Site Assignment for Relations and Join Operations in Distributed Transaction Processing", *IBM Technical Disclosure Bulletin*, Vol. 32, No. 4A, pp. 306-314, September 1989) describe a technique for minimizing the inter-site message traffic needed to execute join queries by first decomposing queries into relational steps and then making integrated site assignments based on linear integer programming techniques.

There remains a clearly-felt need in the art for improved query optimization techniques in large relational database management systems. The primary objective for any query optimizer system is to ensure that the solution space of feasible plans contains the most efficient plans without making the space too large for practical generation and search. The DP optimizer produces exponentially complex solution spaces as the price for ensuring identification of the global optimum execution plan. None of the many heuristic limitation (HL) optimizers known in the art can limit solution space complexity without unpredictably eliminating optimal solutions and thereby losing any assurance that the limited space embraces the globally optimum solution.

There is accordingly a need in the art for a dynamic programming (DP) optimization technique with bounded solution space complexity. The related unresolved problems and deficiencies are clearly felt in the art and are solved by this invention in the manner described below.

SUMMARY OF THE INVENTION

The system of this invention is a new "iterative" dynamic programming (IDP) technique for generating execution plan solution spaces of bounded complexity. The IDP system of this invention iteratively calls the dynamic programming (DP) process for query graph subsets of $T_L$ or fewer relations, where $T_L$ represents a predetermined size limit that may be arbitrarily selected to limit the solution space complexity. The join graph is divided into subgraphs of no more than $T_L$ relation nodes by a "greedy heuristic" procedure or other similarly useful process before subgraph optimization through exhaustive enumeration of execution plans by DP.

It is an object of this invention to limit optimizer search space complexity without unpredictably eliminating the most efficient query execution plans therefrom. It is an advantage of the method of this invention that the final execution plan includes a known global optimum for each of the query subgraphs generated by the greedy heuristic. It is a feature of the method of this invention that the (perhaps suboptimal) execution plans generated by the greedy heuristic procedure do not appear in the final optimal query execution plan.

It is another object of this invention to provide an improved query optimization technique that can be immediately applied to any existing database management system that uses dynamic programming (DP). It is an advantage of the system of this invention that any existing DP query optimizer can be quickly and efficiently modified to incorporate the method of this invention.

It is yet another object of the method of this invention to reduce thr query optimization cost for large join queries without incurring an unanticipated risk of unnecessary execution costs. It is an advantage of the IDP system of this invention that acyclic join queries can be optimized on average to within a few percent of the DP plan cost at a small fraction of the DP optimization cost. It is a feature of this invention that both the space complexity and the risk of suboptimal solutions are precisely controlled by a threshold parameter $T_L$.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
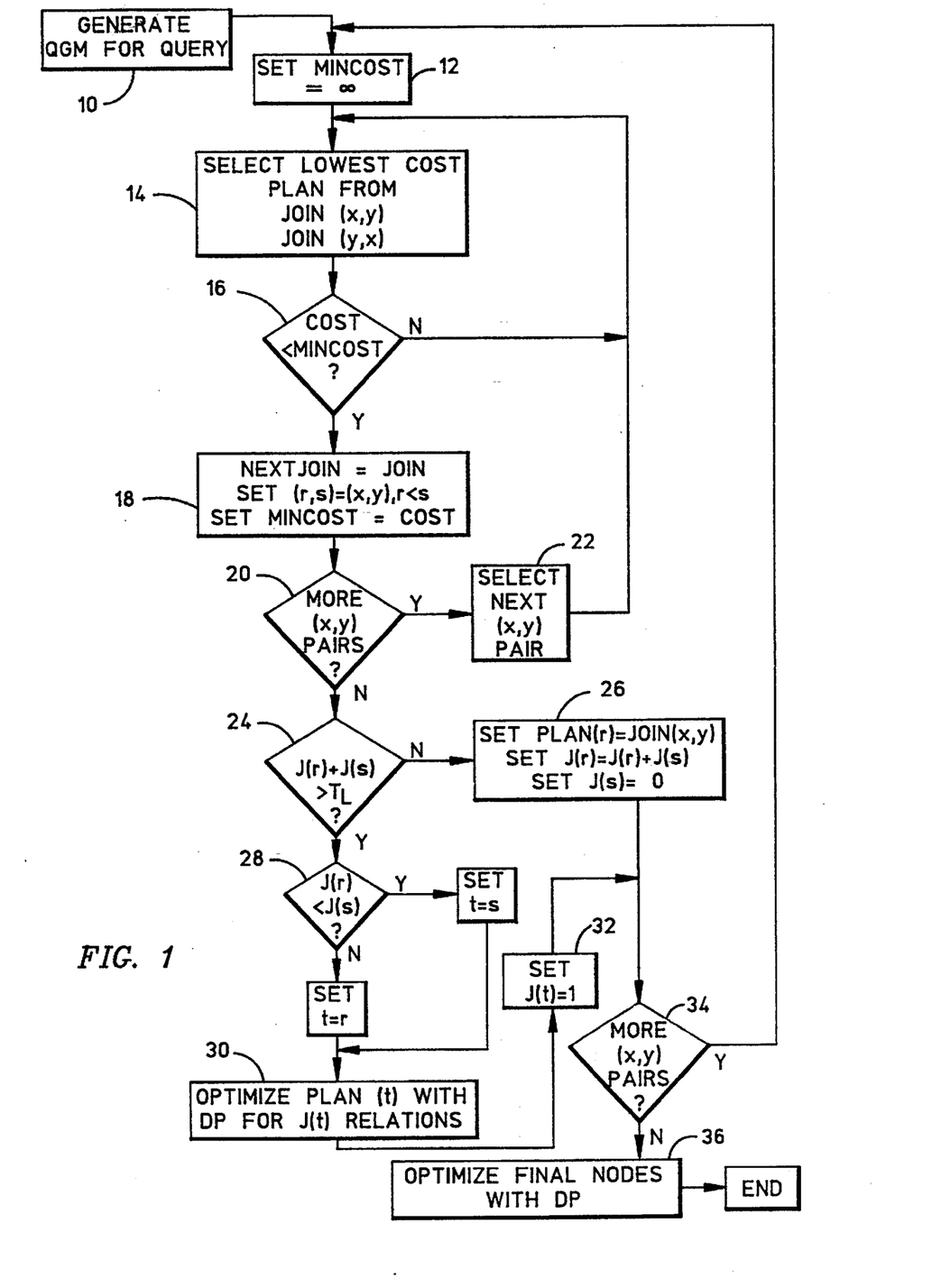
FIG. 1 is functional block diagram of a flow chart showing a preferred method of this invention.

FIG. 1 provides a flowchart exemplifying a preferred embodiment of the IDP query optimization process of this invention. FIG. 1 may be understood with reference to the following description and with reference to Table 1, which provides a pseudocode listing of the process of this invention.

TABLE 1

IDP Pseudocode Embodiment

```
input join graph G and size limit T_L
while IGI > 1 do                                          //stop when no more relations to join
    MinCost = ∞                                           //use min cost heuristic
    for x, y in G connected by an edge do                 //examine all unjoined connected pairs
        Join=mincost(plan[x]×plan[y], plan[y]×plan[x])    //try both join orders
        if Join.cost < MinCost then                       //remember minimum cost join
            NextJoin = Join
            r = min (x,y)
            S = max (x,y)
            MinCost = Join.cost
        endif
    endfor
    if Irelations[r] ∪ relations[s]I > T_L then           //has the size limit T_L been exceeded?
        if Irelations[r]I > Irelations[s]I then           //call DP on the larger subgraph
            t = r
        else
            t = s
        endif
        plan[t] = DP(relations[t])                        //defer join and call DP for plan
        relations[t] = {(relations[t])}                   //treat relations[t] as compound element
    else                                                  //keep going with greedy heuristic
```

TABLE 1-continued

IDP Pseudocode Embodiment

```
        plan[r] = NextJoin                              //update GH plan associated with r
        relations[r] = relations[r] ∪ relations[s]      //collapse s into r
        relations[s] = 0
    endif
endwhile
output DP(relations[1])                                 //call DP one last time
```

In FIG. 1, an N-way join query is first converted to a Query Graph Model (QGM) at step 10. This procedure is well-known in the art and produces a canonical QGM herein denominated the "join graph G". The process of this invention also requires the input of the predetermined limit, herein denominated the "enumeration threshold $T_L$", shown at step 24 et seq. Enumeration threshold $T_L$ represents the maximum number of relations in any subgraph $G_L$ referred to the dynamic programming (DP) optimization process and operates to bound the complexity of the DP search space used in optimizing graph G, as described below. In Table 1, the term "relations[x]" denominates the base relation or relation subgraph corresponding to relation node x and the term "plan[x]" denominates the query execution plan selected by GH or DP for node x. Although not shown, the process is initialized with relations[x]={x} and plan[x]=ACCESS(x). In FIG. 1, the notation for relations[x] is "J(x)", which is herein denominated the "node joinder number" $J_x$ for node $R_x$ and represents the number of nodes in the subgraph $G_x$ associated with node $R_x$.

In FIG. 1, a "mincost" parameter is first set as high as possible at step 12. The inner loop then starts at step 14, where a first connected node pair ($R_x$, $R_y$) is tested for execution cost in both directions (i.e., joining $R_x$ to $R_y$ with predicate $E_{xy}$ and joining $R_y$ to $R_x$ with predicate $E_{yx}$). Step 14 selects the optimal two-way join plan for two relations from the search space having two plans differing only in the join order. The cost of the optimal join order for connected node pair ($R_x$, $R_y$) is then tested against mincost at step 16 and, if the cost is not less than mincost, the procedure returns to step 14 to select another connected node pair for evaluation. If step 16 determines that the new two-way join plan has an execution cost that is less than the mincost saved from the previous optimal two-way plan, then step 18 resets some parameters to save the two-way join plan as the new "nextJoin" (the new optimal two-way join plan) and tests for more untested connected node pairs at step 20.

If step 20 shows more connected node pairs await testing, step 22 selects another such connected pair (arbitrarily) and returns to step 14 to evaluate the next pair. If no untested connected node pairs remain to be evaluated, step 24 tests the two-way join complexity by adding the node joinder numbers $J_r + J_s$ for the connected node pair ($R_r$, $R_s$) found to have the lowest cost of all such pairs in graph G. This sum is compared to the enumeration threshold $T_L$ at step 24 and, if $J_r + J_s < T_L$, then step 26 merges the connected node pair ($R_r$, $R_s$) into a single node $R_r$ having a new node joinder number $J_r = J_r + J_s$ and node $R_s$ is eliminated from the join query graph G. The procedure returns to step 12 (after testing for more node pairs in step 34) to re-examine every one of the connected node pairs in the join query graph modified by the merger of nodes r and s.

The process shown in steps 12 through 26 continues until step 24 finds that the proposed two-way join exceeds the complexity bound imposed by enumeration threshold $T_L$.

When this occurs, the procedure branches to step 28 to determine the larger of the two subgraphs $G_r$ and $G_s$ represented by modes (r,s). The larger subgraph $G_t$ is selected for DP optimization in step 30.

Step 30 makes a call to the dynamic programming (DP) optimizer process for optimization of the subgraph $G_t$ that embraces the $J_t$ relations represented by the larger of the two subgraphs $G_r$ and $C_s$. After step 30 exhaustively enumerates all joint execution plans and selects the optimal plan $P_t$ for subgraph $G_t$, the node joinder number $J_t$ is reset to unity to indicate that node $R_t$ now represents execution plan $P_t$ and that the join subgraph $G_t$ will not be re-optimized again in this process. After resetting $J_t$ at step 32, join graph G is reviewed to see if additional connected node pairs exist at step 34. If another connected node pair ($R_x$, $R_y$) is found in graph G, the procedure returns to step 12 substantially as shown in FIG. 1. If no more connected node pairs exist; that is, if the earlier procedure has finally reduced join graph G to a single node, then step 36 makes a final call to the DP optimizer to optimize the relation join plan at the final node, thereby producing the execution plan P for the entire join graph G.

Referring to Table 1 and FIG. 1, it can be appreciated that the main loop (steps 14 through 22) is nearly identical to the greedy Sgd heuristic discussed above in connection with the recited 1992 Chen et at. reference. The IDP method of this invention uses a greedy heuristic (GH) such as the II process to divide the join graph G into subgraphs having $T_L$ or fewer relations. The GH optimization is first performed to generate one or more subgraphs, each of which is allowed to build up a GH query plan join-by-join. After adding to the GH plan the join for a connected node pair, the two nodes in the pair are collapsed into a single node in join graph G. Whenever the GH optimizer discovers that the next join must exceed enumeration threshold $T_L$, the join is deferred and the DP optimizer is called to optimize the larger of the two subgraphs embraced by the attempted join. This process continues until the GH process adds the last join to a GH plan, at which point DP is called once more to optimize the remaining subgraph.

Advantageously, the GH join plans generated by the GH process never appear in the final output plan P. All join plans in the final output plan P are DP plans generated by dynamic programming. While the final output plan P cannot be assured of optimality, the plan for each of the several subgraphs is assuredly optimal and the final plan P is a combination of these optimal subgraph plans. This invention uses a GH process to intelligently divide the join graph G into subgraphs of $T_L$ or fewer relations. Unbounded DP optimizers can be shown to have time and space complexity of $O(3^N)$ and $O(2^N)$, respectively, where N is the number of relations to be joined in graph G (according to the above-cited Ono et al. reference). Consequently, the time and space complexity of the bounded Iterative Dynamic Programming (IDP) procedure of this invention can be shown to be $$O\left(\frac{N}{T_L} \cdot 3^{T_L}\right) \text{ and } O\left(\frac{N}{T_L} \cdot 2^{T_L}\right),$$

respectively. This invention for the first time allows the complexity to be "tuned" by changing the $T_L$ threshold value.

Figure 2A:
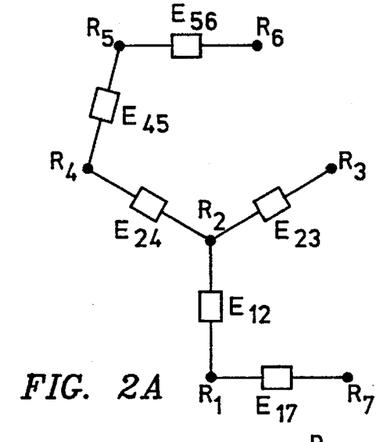
FIGS. 2A–2K illustrate the optimization of an exemplary acyclic query graph according to the method of this invention.

An example is now provided to assist in appreciating the method of this invention. Referring to FIG. 2A, a 6-way join graph G is shown as joining seven relations $\{R_1, R_2, \ldots R_7\}$ by means of six predicates $\{E_{17}, E_{12} \ldots, E_{56}\}$. Essentially, join graph G in FIG. 2A depicts a six-way join query by depicting each relation as a relation node $R_i$ and by depicting each two-way join as a predicate edge $E_{ij}$ connecting two nodes to form a connected node pair $(R_i, R_j)$. This nomenclature is familiar to practitioners in the relational database query optimization art and is used consistently throughout this disclosure. Initially, each relation node in FIG. 2A is assigned a node joinder number $J_i=1$ (not shown), thereby representing that each relation node embraces a subgraph consisting of a single "base" relation. The enumeration threshold $T_L$ is set to 3 for this example.

Figure 2B:
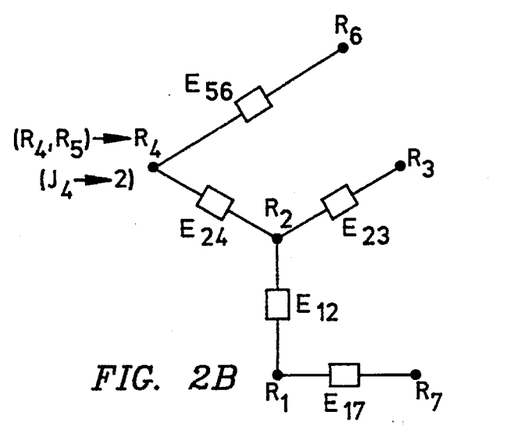

FIG. 2B represents the join graph G after the first completion of GH step 26 (FIG. 1). In the example, the GH optimizer has selected the connected node pair $(R_2, R_3)$ as having the optimal join cost of all possible two-way joins in graph G. This connected node pair is collapsed according to this invention in FIG. 2B into the lower-numbered relation node $R_4$ having a node joinder number $J_4=2$.

Figure 2C:
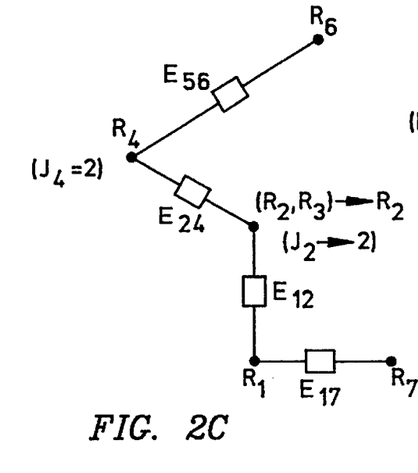
Figure 2D:
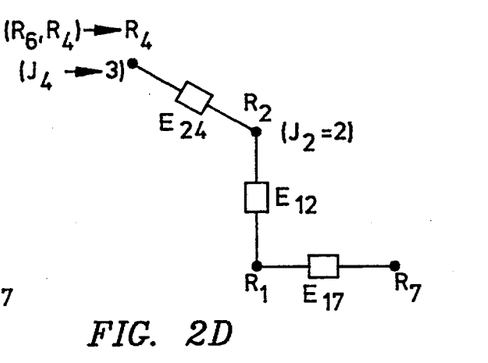

In FIG. 2C, the GH optimizer has selected the connected node pair $(R_2, R_3)$ the lowest two-way join cost of all possible 2-way joins in the graph G of FIG. 2B. Note that the IDP process of this invention does not restrict the GH optimizer to a "pipelined" join with the previously joined subgraph $G_4$ at collapsed node $R_4$, which is an important feature of the method of this invention. After the connected pair $(R_2, R_3)$ is collapsed according to this invention into node $R_2$ having the node joinder number $J_2=2$, the GH optimizer re-evaluates the five-node join graph in FIG. 2C and selects the connected node pair $(R_6, R_4)$ as having the optimal join cost (FIG. 2D). Collapsing the connected node pair $(R_6, R_4)$ into node $R_4$ increases the node joinder number $J_4$ to 3 because of the earlier node pair collapse. $J_4=3$ does not exceed the enumeration threshold $T_L=3$ for this example so the GH optimizer next collapses the connected pair $(R_6, R_4)$ into a subgraph $G_4$ at relation node $R_4$ of FIG. 2D.

Figure 2E:
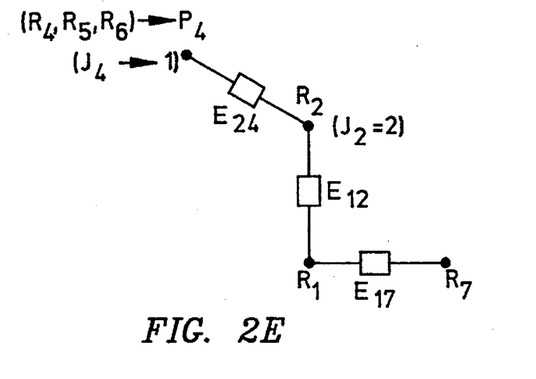

At this point, the GH optimizer selects the node pair $(R_2, R_4)$ as having the optimal join cost. However, because $J_2+J_4=5>T_L=3$, the GH optimizer halts and calls the DP optimizer to create a globally optimal execution plan for the (larger) subgraph $G_4$ embraced by relation node $R_4$. As seen in FIG. 2E, the DP optimizer creates a plan $P_4$ for joining subgraph $G_4$ embracing nodes $R_4$, $R_5$, and $R_6$. After creating plan $P_4$, the node joinder number $J_4$ is reset to 1 and the GH optimizer process returns to the four-node graph G in FIG. 2E.

Figure 2F:
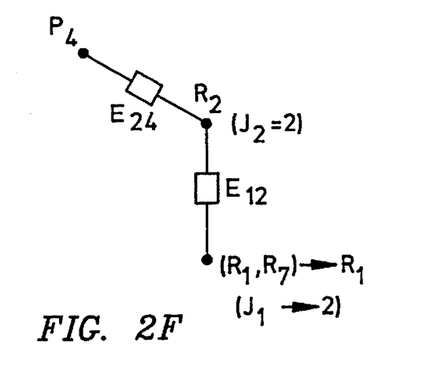
Figure 2G:
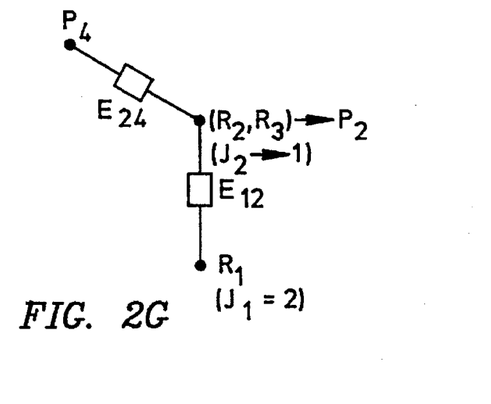
Figure 2H:
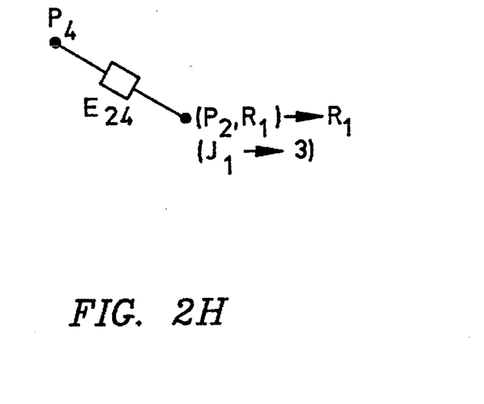

In FIG. 2F, perhaps because of the replacement of node $R_4$ with plan $P_4$, the GH optimizer next selects the connected pair $(R_1, R_7)$ instead of $(R_2, P_4)$. This pair is collapsed into relation node $R_1$ and $J_1$ is set to numeral 2. Subsequently, the GH optimizer attempts to join the connected node pair $(R_2, R_1)$ but is halted because $J_2+J_1=4>T_L=3$. Although the larger of the two join subgraphs $G_2$ and $G_1$ should be selected, one is arbitrarily selected because $J_1=J_2=2$. As seen in FIG. 2G the DP optimizer is called to optimize the subgraph $G_2$ represented by node $R_2$ and the globally optimum plan $P_2$ is selected, with $J_2$ reset to 1. In FIG. 2H, the connected pair $(P_2, R_1)$ is finally collapsed by the GH process into relation node $R_1$ having a node joinder number $J_1=3=J_2+J_1$.

Figures 2I, 2J, 2K, 5:
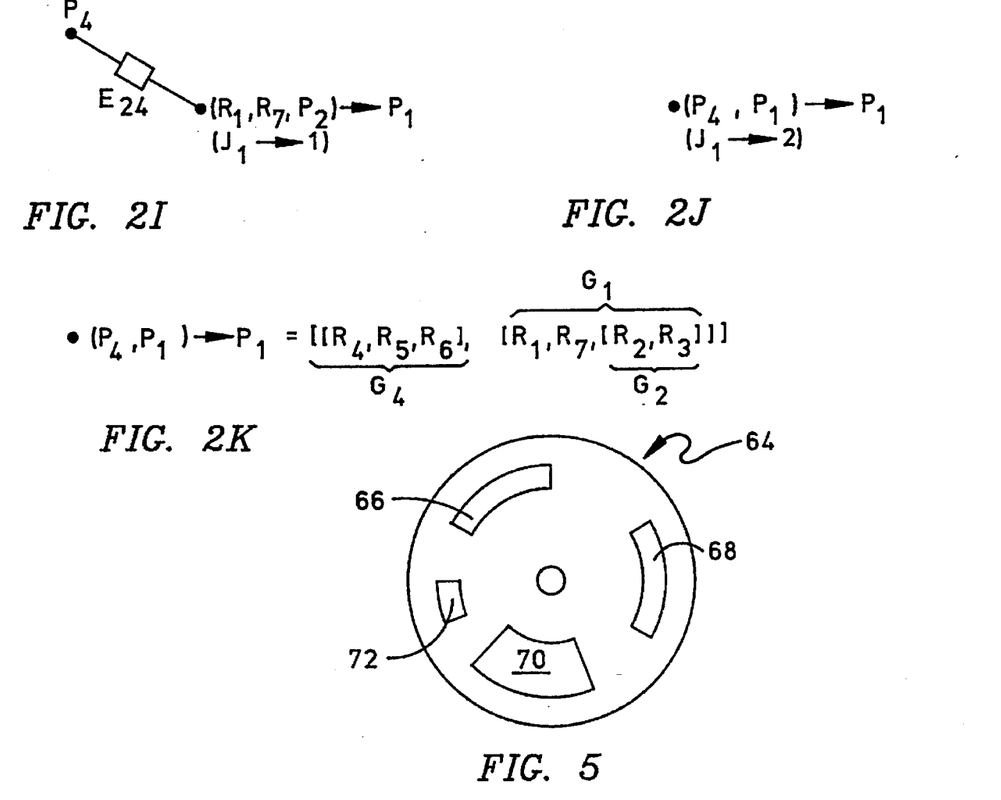
FIG. 5 is an exemplary computer program product incorporating means for directing a computer system to perform the method of this invention.

Once again, the GH optimizer halts upon attempting to join the connected node pair $(P_4, R_1)$ because $J_4+J_1=4>T_L=3$. FIG. 2I shows the result of DP optimization of the larger subgraph $G_1$ to produce optimal execution plan $P_1$, where $J_1$ is reset to 1. In FIG. 2J, the GH process collapses the last connected node pair $(P_4, P_1)$ into node $R_1$ having a node joinder number $J_1=2$.

FIG. 2K illustrates the final step 36 (FIG. 1) where the DP optimizer is called to select an optimal execution plan for subgraph $G_1$. Importantly, this final execution plan $P_1$ represents the "global" optimum execution plan for joining the subgraphs $G_4$ and $G_1$. From the example shown in FIG. 2K, it can be appreciated that the Iterative Dynamic Programming method of this invention reduces the complexity of query optimization in a selectable fashion while minimizing the possibility of unknowingly missing optimal execution plans.

Figure 3:
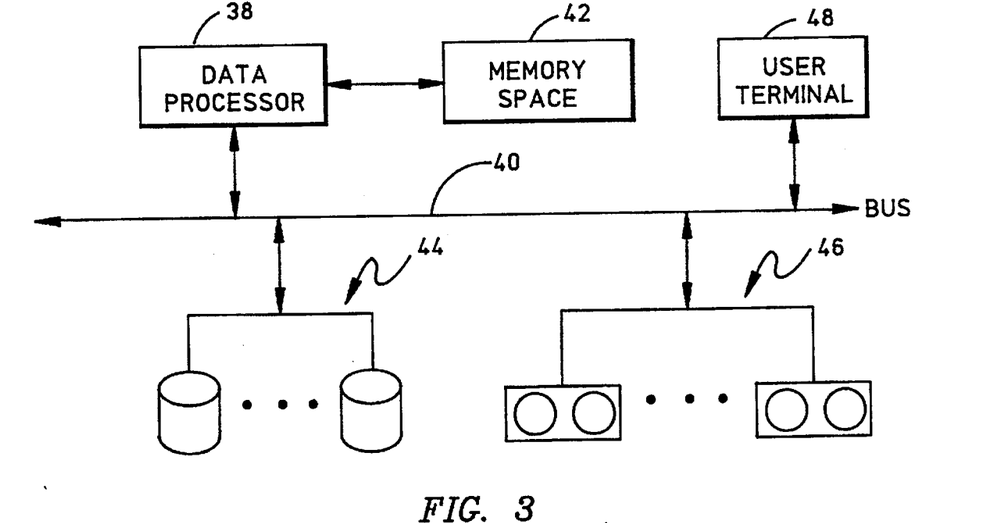
FIG. 3 is a functional block diagram of a computer system suitable for embodiment of the IDP query optimizer of this invention.

FIG. 3 provides a functional block diagram exemplifying a data processing system suitable for implementation of the system of this invention. In FIG. 3, a data processor 38 is shown coupled to a primary bus 40 and a memory space 42. Bus 40 is also coupled to a direct access storage device (DASD) external store 44 and a magnetic tape external store 46, both suitable for the permanent storage of database relations. A user terminal 48 suitable for query input is also shown coupled to bus 40.

Figure 4:
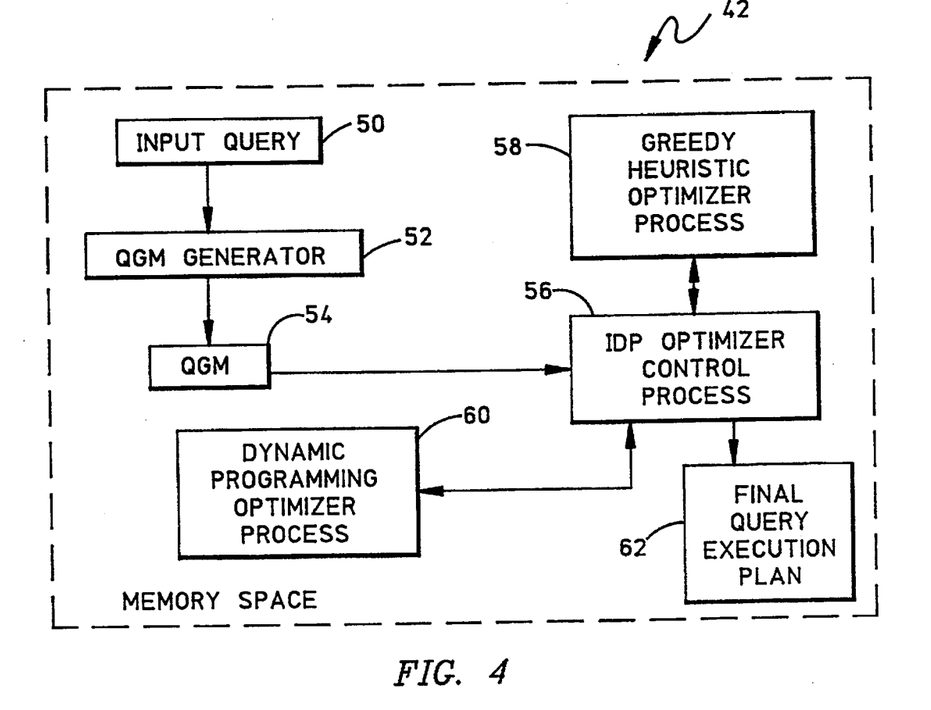
FIG. 4 is a functional block diagram showing in more detail the memory space of the computer system from FIG. 3.

In FIG. 4, memory space 42 is shown in greater detail. The IDP system of this invention may be embodied as a collection of program and data processes in computer memory substantially as shown in FIG. 4, wherein the user database query is first stored as an input query 50. Input query 50 is processed by a Query Graph Model (QGM) generator process 52 to produce a QGM 54, herein denominated the join graph G.

The iterative dynamic programming (IDP) optimizer of this invention includes the IDP control process 56, which accepts join graph G from QGM 54 and calls either a greedy heuristic (GH) optimizer process 58 or the dynamic programming (DP) optimizer process 60, as appropriate. After completion of the process discussed above in connection with Table 1 and FIG. 1, IDP control process 56 produces an optimal query execution plan 62, herein denominated the optimal plan P, thereby completing the IDP query optimization process of this invention.

The inventors have conducted experiments to obtain some measure of the actual improvement in query optimization efficiency realized over the DP system by the IDP system of this invention. In each experiment, 16-way join queries were optimized by DP and IDP optimizers and resulting plans were compared on the basis of estimated cost using a simple sort-merge-join cost model. No restrictions were placed on the shape of the execution trees and arbitrarily bushy trees were permitted.

In conducting the 16-way join experiments, the inventors used the key parameter values shown in Table 2. The Table 2 parameters were selected after some experimentation with different values showed that results were reasonably consistent without regard to actual parameter values.

TABLE 2

Key Parameter Settings

| Description | Default |
| --- | --- |
| processor speed | 40 MIPS |
| cost to compare 2 records | 200 instructions |
| record size | 200 bytes |
| I/O block size | 256 KB |
| disk bandwidth | 3 MB/sec |
| relations in each join | N = 16 |
| size limit $T_L$ for IDP | $T_L = 10$ |
| number of experiments | 100 |

Join graphs were generated using the procedure described by Hong et al. ("Optimization of Parallel Query Execution Plan in XPRS", *Distributed and Parallel Databases*, vol. 1, no. 1, pp. 9–32, January 1993). To generate a random join of k relations, Hong et al. first randomly chose k relations. Then they started by moving the first relation to a chosen list, leaving the rest in an unchosen list. They randomly picked a relation in the unchosen list, joined it with a randomly picked relation from the chosen list on two randomly chosen attributes and moved it from the unchosen list to the chosen list. They repeated this operation until the unchosen list became empty; thereby generating a random join on k relations. This procedure generates only "acyclic" graphs. The inventors selected relation cardinalities and join selectivities to create a large variance in the cost of different queries.

Four relation sizes were used; small, medium, large and very large. Each had an equal probability of being chosen. The cardinalities of small, medium, large and very large relations were uniformly distributed over the intervals (1K, 2K,), (10K, 20K), (100K, 200K), and (1,000K, 2,000K) tuples, respectively.

The results of the inventor experiments are shown in Table 3, wherein the first column shows the cost of the plans generated by the IDP method of this invention relative to the DP method known in the art, averaged over 100 trials. That is, by denominating $DP_i$ and $IDP_i$ to be the cost of the plan generated by DP and IDP for the $i^{th}$ query, respectively, then the first column in Table 3 is the mean ±standard deviation of the ratio $IDP_i/DP_i$. As may be appreciated with reference to Table 3, the IDP of this invention is (on average) capable of optimizing large join queries to within 6% of DP effectiveness in 0.5% of the time and in 9% of the space necessary for DP optimization. Not surprisingly, the number of joins enumerated was also significantly less for IDP.

TABLE 3

Summary of Results

| Process | Relative Plan Cost | Avg Joins Enumerated | Avg Space Consumption | Avg Opt Time |
| --- | --- | --- | --- | --- |
| DP | 1.00 ± 0.00 | 28,156 | 340KB | 425 sec |
| IDP | 1.06 ± 0.02 | 1,383 | 30KB | 2 sec |

Advantageously, the IDP optimization system of this invention can be built on top of an existing DP process so that existing DP optimizers, such as the optimizer used in the DB2/6000 DBMS sold by the International Business Machines Corporation, can be easily extended to incorporate the IDP procedure of this invention. In particular, existing machinery for handling order requirements, multiple joins, access methods, and the like, can be used without modification. More advantageously, the IDP optimizer of this invention can be dynamically tuned to any desired optimization level, which is not possible with any other heuristic limitation optimizer process known in the art. Finally, the IDP process of this invention is much more robust than the heuristic limitation processes known in the art because the DP optimizer exhaustively enumerates plans for each of the subgraphs making up the join query.

While this invention is primarily described as a process, it can be appreciated by a person of ordinary skill in the art that an apparatus, such as the data processing system discussed above in connection with FIGS. 3–4, can be configured to facilitate the practice of the process of this invention. Such a processor may include appropriate program means for executing the process of this invention such as described above in connection with FIG. 4. Also, an article of manufacture, such as the pre-recorded floppy disk 64 shown in FIG. 5 or other similar computer programming product intended for use with a data processing system, may include a storage medium and program means recorded thereon for directing the data processing system to facilitate the practice of the process of this invention. For example, in FIG. 5, disk 64 may include stored program objects exemplified by program object 66 for directing a data processing system to invoke a GH optimizer, program object 68 for directing a data processing system to invoke a DP optimizer, program object 70 for directing a data processing system to iterate between GH and DP optimizers substantially as described above in connection with FIG. 1, and a program object 72 for directing a data processing system to select a final optimal execution plan for a join query. It should be readily appreciated that such computer program products and like articles of manufacture also fall within the spirit and scope of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for selecting an execution plan P for a N-way join query in a computer-implemented database system having a plurality of stored database relations, wherein said N-way join query is represented by a join graph G connecting each $R_i$ of a plurality N+1 of relation nodes by a predicate edge$E_{ij}$ to another $R_j$ of said relation node plurality to form a plurality N of connected node pairs ($R_i$, $R_j$) and wherein $1 \leq i,j \leq N+1$ and $N>1$ are positive integers, said method comprising the steps of:

(a) selecting from said join graph G for a threshold value $T_L$ a subgraph $G_L$ connecting a plurality $N_L \leq T_L$ of said relation nodes;

(b) selecting the optimal execution plan $P_L$ from among all feasible execution plans for joining said subgraph $G_L$ of said relation nodes;

(c) replacing said relation node subgraph $G_L$ in said join graph G with a relation node $R_L$ representing the relation produced by said optimal execution plan $P_L$; and (d) repeating said selecting steps (a)–(b) and said replacing step (c) until said execution plan P is selected for said join graph G.

2. The method of claim 1 wherein the first said selecting step is performed according to a greedy heuristic procedure for minimizing the join execution cost for said subgraph $G_L$.

3. A method for selecting an execution plan P for a N-way join query in a computer-implemented database system having a plurality of stored database relations, wherein said N-way join query is represented by a join graph G connecting each $R_i$ of a plurality N+1 of relation nodes by a predicate edge $E_{ij}$ to another $R_j$ of said relation node plurality to form a plurality N of connected node pairs ($R_i$, $R_j$), wherein each said relation node $R_i$ has a joinder number $J_i$ corresponding to the number of said relations embraced thereby and wherein $1 \leq i$, $j \leq N+1$ and $N > 1$ are positive integers, said method comprising the steps of:

(a) selecting from said join graph G the connected node pair ($R_i$, $R_j$) having the lowest join execution cost of all said connected node pairs in said join graph G;

(b) comparing to a threshold $T_L$ the sum $J_k = J_i + J_j$ of the joinder numbers associated with said selected node pair ($R_i$, $R_j$), wherein $J_i \geq J_j$;

(c) if $J_k > T_L$ selecting the optimal execution plan $P_i$ from among all feasible execution plans for joining the plurality $J_i$ of said relations embraced by said relation node $R_i$ and resetting said joinder number $J_i = 1$ therefor to indicate that said relation node $R_i$ now embraces only the relation produced by said plan $P_i$, wherein $1 \leq k \leq N+1$ is a positive integer; otherwise (d) replacing said connected node pair ($R_i$, $R_j$) with a replacement node $R_k$ having a joinder number $J_k = J_i + J_j$ in said join graph G; and (e) if at least one said connected node pair ($R_i$, $R_j$) remains in said join graph G, repeating said steps (a)–(d); otherwise (f) repeating said selecting step (c) for said replacement node $R_k$ to select said execution plan P for said join graph G.

4. A query optimizer subsystem for selecting an execution plan P for a N-way join query in a computer-implemented database system having a data processor and a plurality of stored database relations, said subsystem comprising:

input means for accepting said N-way join query represented as a join graph G connecting each $R_i$ of a plurality N+1 of relation nodes by a predicate edge $E_{ij}$ to another $R_j$ of said relation node plurality to form a plurality N of connected node pairs ($R_i$, $R_j$) and wherein $1 < i$, $j < N+1$ and $N > 1$ are positive integers;

greedy heuristic means coupled to said input means for selecting from said join graph G for a threshold value $T_L$ a subgraph $G_L$ connecting a plurality $N_L \leq T_L$ of said relation nodes according to a greedy heuristic procedure for minimizing the join execution cost for said subgraph $G_L$;

dynamic programming means coupled to said greedy heuristic means for selecting the optimal execution plan $P_L$ from among all feasible execution plans for joining said subset $G_L$ of said relation nodes;

merger means coupled to said greedy heuristic means for replacing said relation node subgraph $G_L$ in said join graph G with a relation node $R_L$ representing the relation produced by said optimal execution plan $P_L$; and iteration means in said data processor for causing said greedy heuristic means, said dynamic programming means and said merger means to repeatedly select and replace said subgraph $G_L$ until said optimal execution plan P is selected for said join graph G.

5. A query optimizer subsystem for selecting an execution plan P for a N-way join query in a computer-implemented database system having a data processor and a plurality of stored database relations, said subsystem comprising:

input means in said data processor for accepting said N-way join query represented as a join graph G connecting each $R_i$ of a plurality N+1 of relation nodes by a predicate edge $E_{ij}$ to another $R_j$ of said relation node plurality to form a plurality N of connected node pairs ($R_i$, $R_x$), wherein each said relation node $R_i$ has a joinder number $J_i$ corresponding to the number of said relations embraced thereby and wherein $1 \leq i$, $j \leq N+1$ and $N > 1$ are positive integers;

two-way plan selection means coupled to said input means for selecting from said join graph G the connected node pair ($R_i$, $R_j$) having the lowest join execution cost of all said connected node pairs in said join graph G;

threshold means coupled to said two-way plan selection means for comparing to a threshold $T_L$ the sum $J_k = J_i + J_j$ of the joinder numbers associated with said selected node pair ($R_i$, $R_x$), wherein $J_i \geq J_j$;

dynamic programming means coupled to said thresholding means for selecting, when $J_k > T_L$, the optimal execution plan $P_i$ from among all feasible execution plans for joining the plurality $J_i$ of said relations embraced by said relation node $R_i$ and for resetting said joinder number $J_i = 1$ therefor to indicate that said relation node $R_i$ now embraces only the relation produced by said plan $P_i$, wherein $1 \leq k \leq N+1$ is a positive integer;

first merger means coupled to said thresholding means for replacing, when $J_k \leq T_L$, said connected node pair ($R_1$, $R_j$) with a replacement node $R_k$ having a joinder number $J_k = J_i + J_j$ in said join graph G; and iteration means for causing said two-way plan selection means, said thresholding means, said dynamic programming means and said merger means to repeatedly select, compare, select and replace said connected node pairs until said execution plan P is selected for said join graph G.

6. A computer program product for use with a query optimizer system for selecting an execution plan P for a N-way join query in a computer-implemented database system having a plurality of stored database relations, wherein said N-way join query is represented by a join graph G connecting each $R_i$ of a plurality N+1 of relation nodes by a predicate edge $E_{ij}$ to another $R_j$ of said relation node plurality to form a plurality N of connected node pairs ($R_i$, $R_l$) and wherein $1 < i$, $j < N+1$ and $N > 1$ are positive integers, said computer program product comprising:

a recording medium;

first means, recorded on said recording medium, for directing said system to select from said join graph G for a threshold value $T_L$ a subgraph $G_F$ connecting a plurality $N_L \leq T_L$ of said relation node;

second means, recorded on said recording medium, for directing said system to select the optimal execution plan $P_L$ from among all feasible execution plans for joining said subgraph $G_L$ of said relation nodes;

means, recorded on said recording medium, for directing said system to replace said relation node subgraph $G_L$ in said join graph G with a relation node $R_L$ representing the relation produced by said optimal execution plan $P_L$; and means, recorded on said recording medium, for directing said system to repeat operation of said first means for directing to select, said second means for directing to select and said means for directing to replace until said execution plan P is selected for said join graph G.

\* \* \* \* \*

UNITED STATES PATENT AND TRADEMARK OFFICE
CERTIFICATE OF CORRECTION

PATENT NO. : 5,671,403
DATED : September 23, 1997
INVENTOR(S) : Shekita et al.

It is certified that error appears in the above-indentified patent and that said Letters Patent is hereby corrected as shown below:

Column 14, line 46, change "$(R_i, R_i)$" to --$(R_i, R_j)$--.

Column 15, line 57, insert a paragraph break after "and".

Column 16, line 2, change "$R_i$" to --$R_j$--.

Column 16, lines 4 and 16, change "$R_x$" to --$R_j$--.

Column 15, line 26, begin a new paragraph at the beginning of this line.

Column 16, line 42, change "$R_i$" to --$R_j$--.

Column 16, line 44, change "$R_1$" to --$R_j$--.

Column 16, line 60, insert a paragraph break after "and".

Signed and Sealed this

Thirty-first Day of March, 1998

Attest:

BRUCE LEHMAN

Attesting Officer

Commissioner of Patents and Trademarks